Oct. 20, 1925.
A. SEIDEL
1,557,783
VEHICLE CONSTRUCTION
Filed May 5, 1925     3 Sheets-Sheet 1
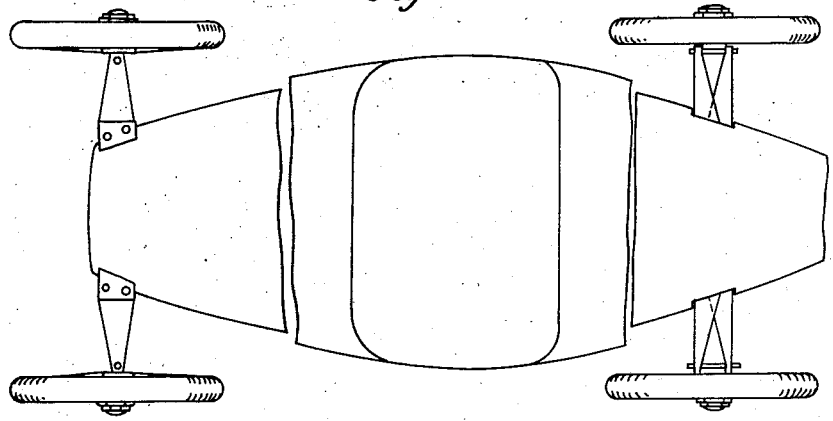
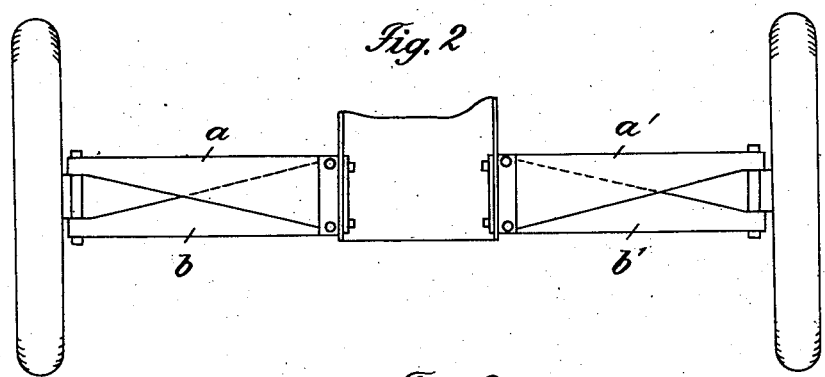
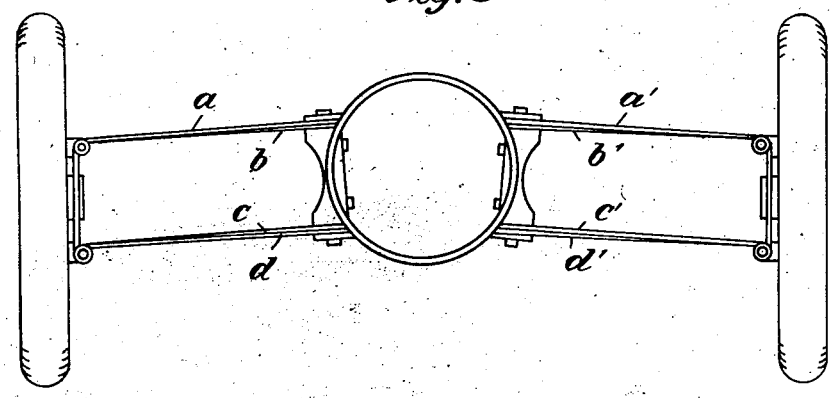

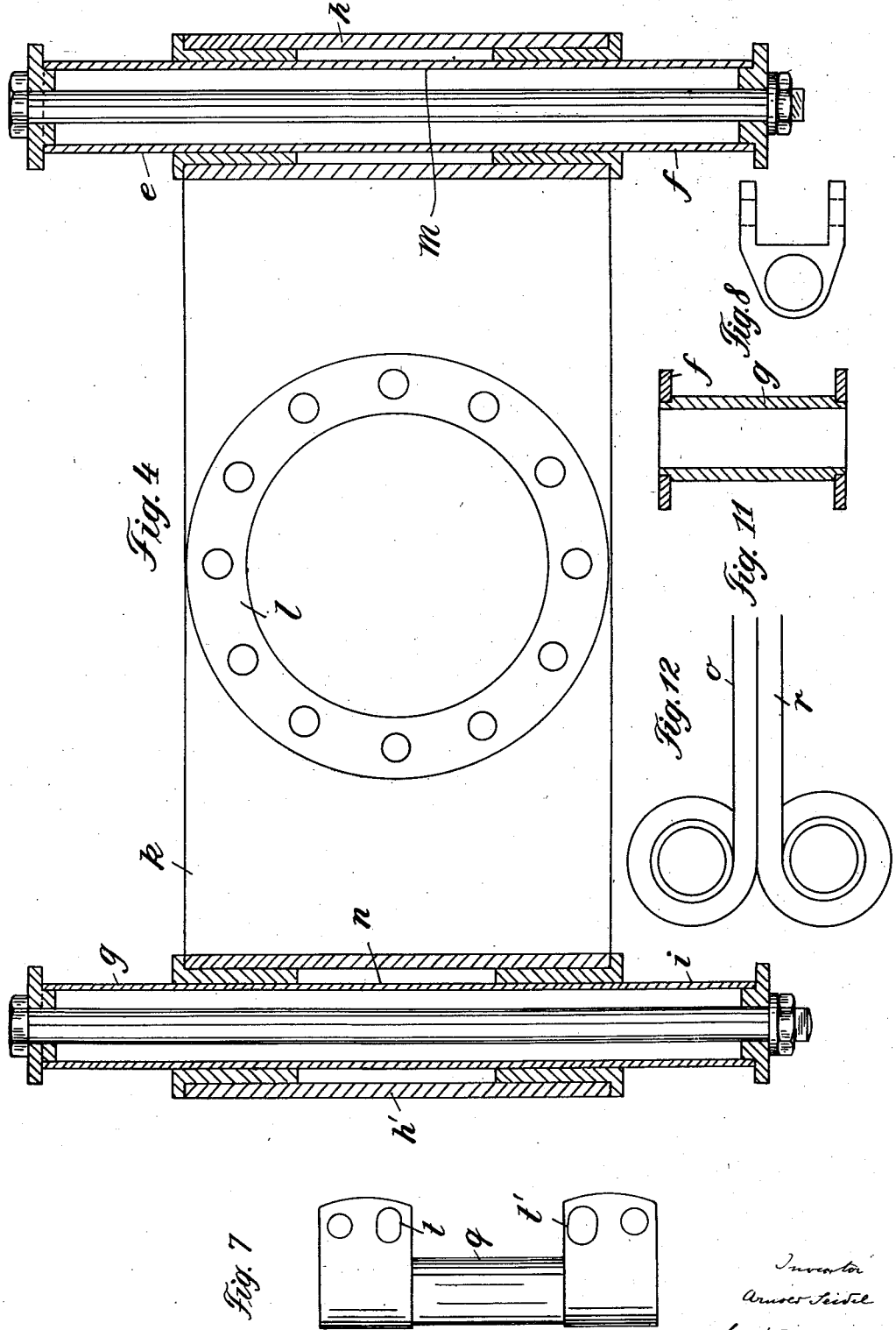

Oct. 20, 1925. 1,557,783
A. SEIDEL
VEHICLE CONSTRUCTION
Filed May 5, 1925 3 Sheets-Sheet 3
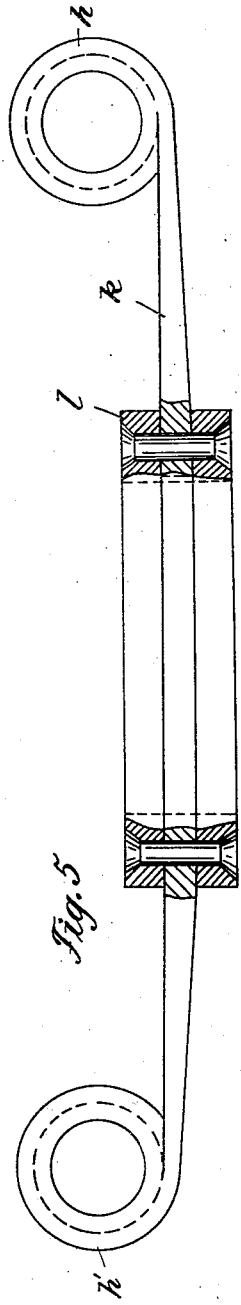
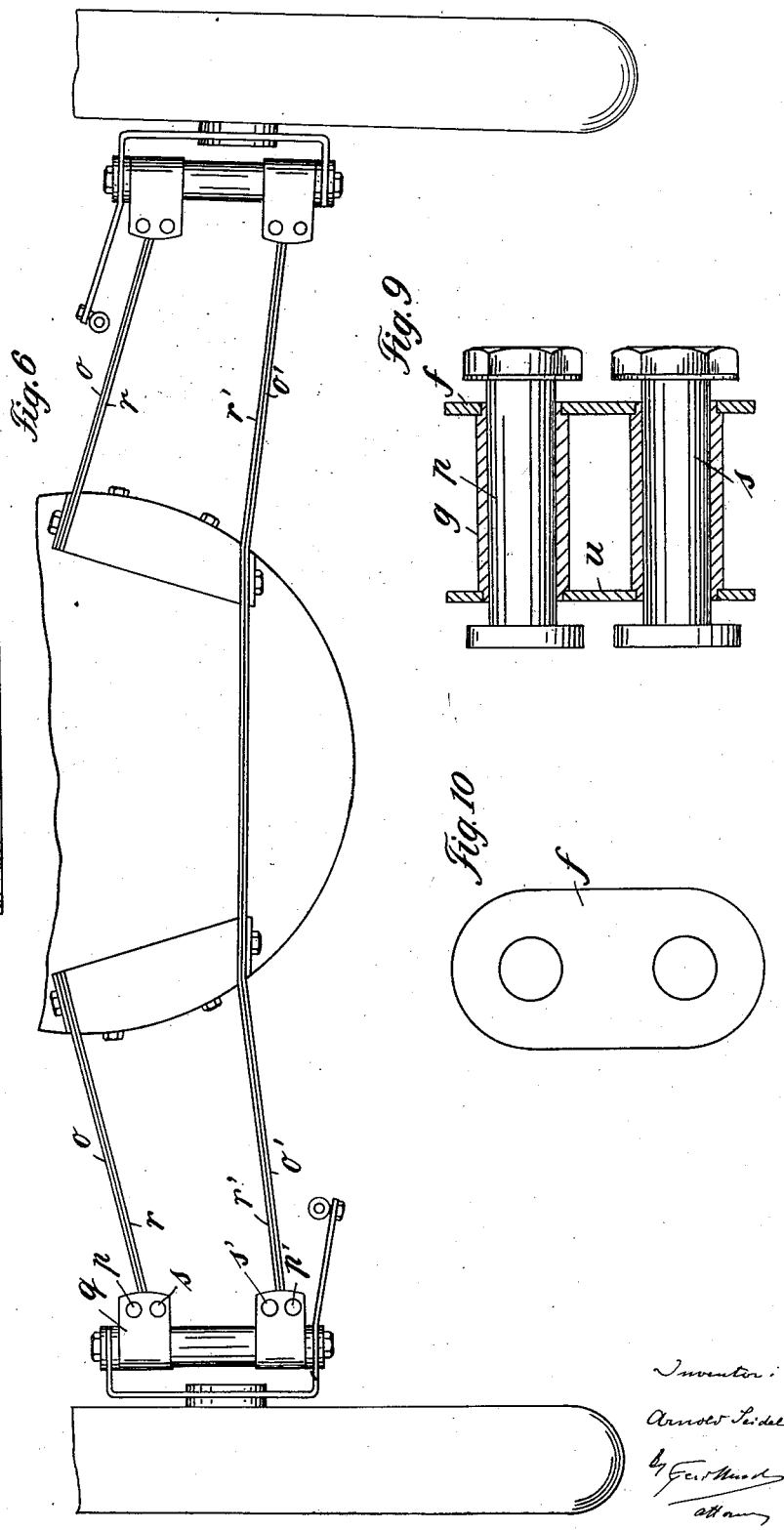
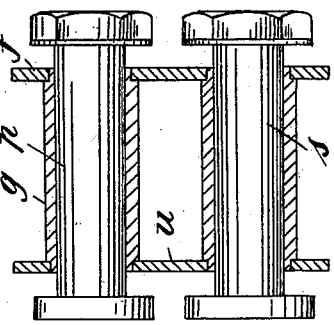
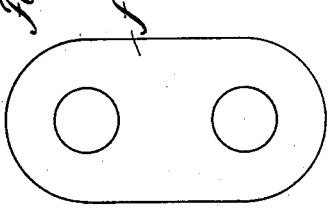

Patented Oct. 20, 1925.

1,557,783

UNITED STATES PATENT OFFICE.

ARNOLD SEIDEL, OF BERLIN-CHARLOTTENBURG, GERMANY.

VEHICLE CONSTRUCTION.

Application filed May 5, 1925. Serial No. 28,251.

*To all whom it may concern:*

Be it known that I, ARNOLD SEIDEL, a citizen of the German Republic, residing at Berlin-Charlottenburg, Germany, have invented certain new and useful Improvements in Vehicle Constructions, of which the following is a specification.

This invention relates to the arrangement of laminated springs transversely to the direction of travel of a motor vehicle by means of two groups of springs, said groups being arranged the one at a certain distance above the other as substitute for the supporting axles which are used at present for connecting the vehicle wheels.

This invention has for its object to compose each of the two groups of laminated springs serving for the above mentioned purposes of at least two plate springs which are entirely or partly placed the one upon the other in such a manner that the freely oscillating ends of the plate springs are each rolled up to form an eye through which a hinge pin is inserted. This hinge pin effects then the connection with the holder for the bearing of a driven vehicle wheel or with the holder of the bushing of the steering swivel journal of a steering wheel, in any case with a holder of a journal.

In this spring arrangement for a driven vehicle wheel the edges of the freely oscillating ends of the plate springs of one group, said plate springs laying partly the one on the other, are preferably fixed on a stud at separate points of the same said stud being rotatable in the holder of the driven wheel.

The guiding-shearing and torsional stresses on the driven vehicle wheel are thus distributed over the whole spring system. When one of the plate springs of this four-spring system breaks, this is not yet dangerous for the guiding of the wheel as the remaining three point suspension is sufficient.

This can be said, with corresponding limitation, also of the spring suspension system for the holders of the bushing for the steering swivel journal for the steering swivel of a steering wheel. In this case the one of—at least—two plate springs which form a group, has preferably its freely oscillating end rolled up to form an eye adapted to rotate on the hinge pin fixed to the holder of the axle journal or steering swivel journal, the other of these two plate springs having its freely oscillating end rolled up to form an eye through which a hinge pin is inserted which engages with a certain play in horizontal direction with the holder of the steering swivel journal so that this second plate spring co-operates in the supporting but guides laterally the corresponding steering wheel only when the first mentioned plate spring is broken.

An embodiment of the invention is shown, by way of example, in the accompanying drawing, in which Fig. 1 shows in a diagrammatical ground plan a closed car with improved spring arrangement.

Fig. 2 shows in plan view and

Fig. 3 in rear elevation the rear driving wheels and the corresponding spring suspension.

Fig. 4 is a side elevation on larger scale and

Fig. 5 a cross section on larger scale of the hinge pin with holder and bearing of the driving wheel.

Fig. 6 shows in front elevation a form of construction of the arrangement of the spring suspension for the steering wheel.

Fig. 7 is a side elevation of Fig. 6.

Fig. 8 shows in plan view respectively the holder for the axle journal and the steering swivel journal.

Fig. 9 is a cross section,

Fig. 10 an elevation,

Fig. 11 a horizontal section of the spring casing for two spring cages which, as shown in Fig. 12 belong together.

It is supposed that the motor car shown in Fig. 1 diagrammatically in plan view has a front wheel steering and rear wheel drive (front wheels at the left of the drawing and rear wheels at the right). Figs. 2 and 3 illustrate the connection of the car frame with the wheels respectively by means of the left springs $a$, $b$, $c$, $d$ and right springs $a'$, $b'$, $c'$ and $d'$, said springs, being arranged the one at the side and behind the others, of one sided triangular shape and obliquely cut. The Figs. 4 and 5 relating to this form of construction show the holder $k$ for the axle journal respectively for the bearing of a driven car wheel, the corresponding bearing bush being adapted to be fixed in a thickening $l$ of this holder $k$.

This holder $k$ has eyes $h$ and $h'$ in which hinge pins $m$ and $n$ are rotatably mounted. On each of the ends $e$, $f$, $g$ and $i$ of these hinge pins one end of the plate springs $a$, $b$, $c$, and $d$ or $a'$, $b'$, $c'$ and $d'$ rolled up to form an eye is fixed. By this manner of fixing the ends of every two plate springs belonging together upon one common hinge pin jamming and tilting of the springs in the swivel bearing is avoided, which might happen when the hinge pins $m$ and $n$ were fixed to the holder $k$ and the ends of the plate springs rotatable on the hinge pins.

When the spring arrangement is applied to the steering wheels of a motor car, application shown in Figs. 6 to 12, the eyes at the ends of the plate springs $o$ and $o'$ are hinged on belts $p$ and $p'$ fixed on the holder $q$ of the steering swivel journal for the steering wheel. The eyes at the ends of the plate springs $r$ and $r'$ are however hinged on bolts $s$ and $s'$ which traverses oblong holes $t$ and $t'$ of the holder $q$. This measure is due to the necessity to enable that the eyes of the plate springs $r$ and $r'$ have a certain but slight play in horizontal direction, when they spring together with the corresponding plate springs $o$ and $o'$.

In order to avoid any rattling of the hinge pins $s$ and $s'$ or rapid wear of the same the bolts $p$ and $s$ respectively $p'$ and $s'$ of the eyes of the plate springs might be further connected with one another by spring suspensions $u$.

I claim:—

1. A transverse spring arrangement for motor cars without supporting axle, comprising in combination four holders for the four axle or steering swivel journals, two groups of plate springs at each side of the car said two groups of each set being arranged the one at a certain distance above the other each group comprising at least two plate springs placed the one on the other the freely oscillating ends of said plate springs being rolled each to form one eye, and a hinge bolt in each eye and effecting the necessary connection with the holder of the corresponding axle journal.

2. A transverse spring arrangement for motor cars without supporting axle, comprising in combination four holders for the four axle or steering swivel journals, two groups of plate springs at each side of the car said two groups of each set being arranged the one at a certain distance above the other each group comprising at least two plate springs placed the one on the other the freely oscillating ends of said plate springs being rolled each to form one eye, a hinge bolt in the two eyes at one end of each group of the plate spring said hinge pin being rotatably mounted in the holder of the corresponding axle journal.

3. A transverse spring arrangement for motor cars without supporting axle, comprising in combination four holders for the four axle or steering swivel journals, two groups of plate springs at each side of the car said two groups of each set being arranged the one at a certain distance above the other each group comprising at least two plate springs placed the one on the other the freely oscillating ends of said plate springs being rolled each to form one eye, a hinge bolt fixed on each steering swivel journal on which hinge bolt the eye of one of the two plate springs of one group of plate springs is adapted to rotate, and a hinge bolt in each steering swivel journal mounted with a certain play in horizontal direction and inserted through the eye of the other of the two plate springs of the group so that this second plate spring assists in supporting but guides the corresponding steering wheel in lateral direction only when the first mentioned plate spring breaks.

In testimony whereof I affix my signature.

ARNOLD SEIDEL.